(12) United States Patent
Hirota et al.

(10) Patent No.: US 6,315,266 B1
(45) Date of Patent: Nov. 13, 2001

(54) PILOT-OPERATED FLOW REGULATING VALVE

(75) Inventors: Hisatoshi Hirota, Hachioji; Tokumi Tsugawa; Yusuke Inoue, both of Tokyo, all of (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 09/612,640

(22) Filed: Jul. 7, 2000

(30) Foreign Application Priority Data

Jul. 12, 1999 (JP) .................................................. 11-197440

(51) Int. Cl.⁷ .................................................. F16K 31/42
(52) U.S. Cl. .......................................... 251/30.01; 251/33
(58) Field of Search .............................. 251/30.01, 30.02, 251/33

(56) References Cited

U.S. PATENT DOCUMENTS 4,596,271 * 6/1986 Brundage ............................... 137/540
5,979,862 * 11/1999 Wolfges ............................. 251/30.01

* cited by examiner

*Primary Examiner*—John Fox
(74) *Attorney, Agent, or Firm*—Nilles & Nilles, S.C.

(57) ABSTRACT

In a silently operating pilot-operated flow regulating valve, a main valve element is not allowed to vibrate freely, e.g., in lateral direction in an opened state and cannot constitute a noise source because while the main valve element is brought into its open position, an urging force acts upon the main valve element so as to tilt it into vibration suppressing contact with the valve seat whereby vibration of the main valve element is restricted.

11 Claims, 4 Drawing Sheets

PILOT-OPERATED FLOW REGULATING VALVE

BACKGROUND OF THE INVENTION

1. Field of the Invention

The invention relates to a pilot-operated flow regulating valve including a main valve element arranged in a flow passage to which high-pressure fluid is supplied, a circular valve seat formed in said flow passage, said main valve element facing said valve seat, a pressure receiving member arranged with its front surface exposed to the fluid in said flow passage, said pressure receiving member being moveable in accordance with a differential pressure between a fluid pressure applied to said front surface in a first portion of said flow passage and a pressure in a pressure control chamber bounded by a rear surface of said pressure receiving member, a driving force transmitting member interposed between said pressure receiving member and said main valve element so as to move said pressure receiving member and said main valve element in directions such that said main valve element moves towards said valve seat into a first, completely seated position and away from said valve seat into other positions allowing a fluid flow through said valve seat, a pilot passage connecting said pressure control chamber with said second portion of said flow passage located at a side of said valve seat opposite to said pressure receiving member, a leak passage of small cross-sectional area permitting leak of fluid between said pressure control chamber and said first portion of said flow passage, urging means for urging said main valve element in a direction opposite to a driving direction of said pressure receiving member, and a pilot passage constant differential-pressure regulating valve which opens when a differential pressure between an inlet and an outlet of said pilot passage becomes higher than a given pressure in order to keep said differential pressure essentially constant In operation of said pilot-operated flow regulating valve the differential pressure between the inlet and the outlet sides of the valve is kept constant to thereby regulate the flow rate of fluid through said valve seat.

2. Discussion of the Related Art

In flow regulating valves in general the differential pressure between the inlet and outlet sides of the valve is regulated by a solenoid such that the flow rate is controlled in accordance with the set differential pressure. For extremely high fluid pressures, however, the solenoid needs to be strong and has to have a huge size when directly actuating the main valve element, compared with the cross-sectional area of the flow passage for the fluid. Strong solenoids are expensive. Said combination lacks practicability.

To avoid said drawback it is known in practice to use pilot-operated types of flow regulating valves for a high pressure applications. Unlike a simple pilot-operated on/off valve, pilot-operated flow regulating flow valves need a constant differential-pressure regulating pilot valve for opening and closing a pilot passage. The solenoid then only needs to be strong enough to actuate the pilot valve which is actuatable by much less force than the main valve element. As a result, a small sized, cheap solenoid, preferably a proportional solenoid, can be used, the actuating force of which is proportional to the value of the current supplied to its coil.

In a conventional pilot operated flow regulating valve the main valve element is arranged in a flow passage for high-pressure fluid and faces the valve seat formed in the flow passage. At the rear side of a pressure receiving member a pressure control chamber is defined. The front surface of the pressure receiving member is exposed to the fluid in the first portion of said flow passage so that the pressure receiving member moves in response to different pressures applied to its front and rear surfaces. A driving force transmitting member is interposed between said pressure receiving member and the main valve element. Also, a pilot passage connects said pressure control chamber with a second portion of the flow passage located below said valve seat opposite the pressure receiving member front surface. A leak passage of small cross-sectional area permits leak of fluid between the pressure control chamber and said first portion of the flow passage. Urging means urge the main valve element in a direction opposite to the driving direction of said pressure receiving member. Said design of a pilot operated flow regulating valve is known from practice. In said conventional pilot-operated flow regulating valve said main valve element when lifted from its valve seat is in a state that it can freely vibrate, e.g. in lateral direction. If said main valve element occasionally vibrates because of the fluid flow and repeatedly collides with its surrounding, e.g. the valve seat, disturbing noise is produced. Said phenomenon is known as "valve rattling". Furthermore, excessive wear may develop at the main valve element and/or at the valve seat.

OBJECTS AND SUMMARY OF THE INVENTION

It is an object of the invention to provide a silent pilot-operated flow regulating valve wherein the main valve element does not vibrate freely, e.g. in lateral direction, when said main valve element opens the flow passage. Said main valve element should not constitute a noise source.

According to a first aspect of the invention in said other positions of said main valve element at least one of said urging means and said driving force transmitting member forces said main valve element into a vibration suppressing contact with only a portion of said circular valve seat.

According to a further aspect of the invention while said main valve element is opened or brought into one of said other positions an urging force of said urging means acts upon said main valve element so as to tilt the same and to thereby restrict vibration of said main valve element.

Whenever the main valve element clears the flow passage for fluid through the valve seat the urging force of the urging means acts upon the main valve element so as to tilt it and to thereby restrict vibration of the main valve element. Consequently, the main valve element is prevented from vibrating freely while opened so that the pilot-operated flow regulating valve never constitutes a noise source. In particular the urging force is tilting the main valve element laterally and into a vibration suppressing contact with only a part of the circular valve seat. In a structurally simple way said tilting effect is produced at the main valve element either by the urging means or the force transmitting member or by the mechanical co-action of both. This intentional contact is maintained by said urging force in said other positions of said main valve element, i.e. as long as said main valve element is not completely seated on said circular valve seat. Since the main valve element is tilted laterally into the vibration suppressing contact with only a part of the circular valve seat, an opening remains between the main valve element and the valve seat allowing the fluid flow. The intentionally created vibration suppressing contact hinders the valve element from vibrating, mainly in lateral direction, and thus avoids the generation of disturbing noise. Furthermore, since the main valve element is hindered to vibrate freely dangerous and sudden collisions between the main valve element and the valve seat are avoided. The life duration of the valve is increased.

BRIEF DESCRIPTION OF THE DRAWINGS

Embodiments of the invention will be described with the help of the drawing. In the drawing is.

DESCRIPTION OF THE PREFERRED EMBODIMENTS

Figure 5:
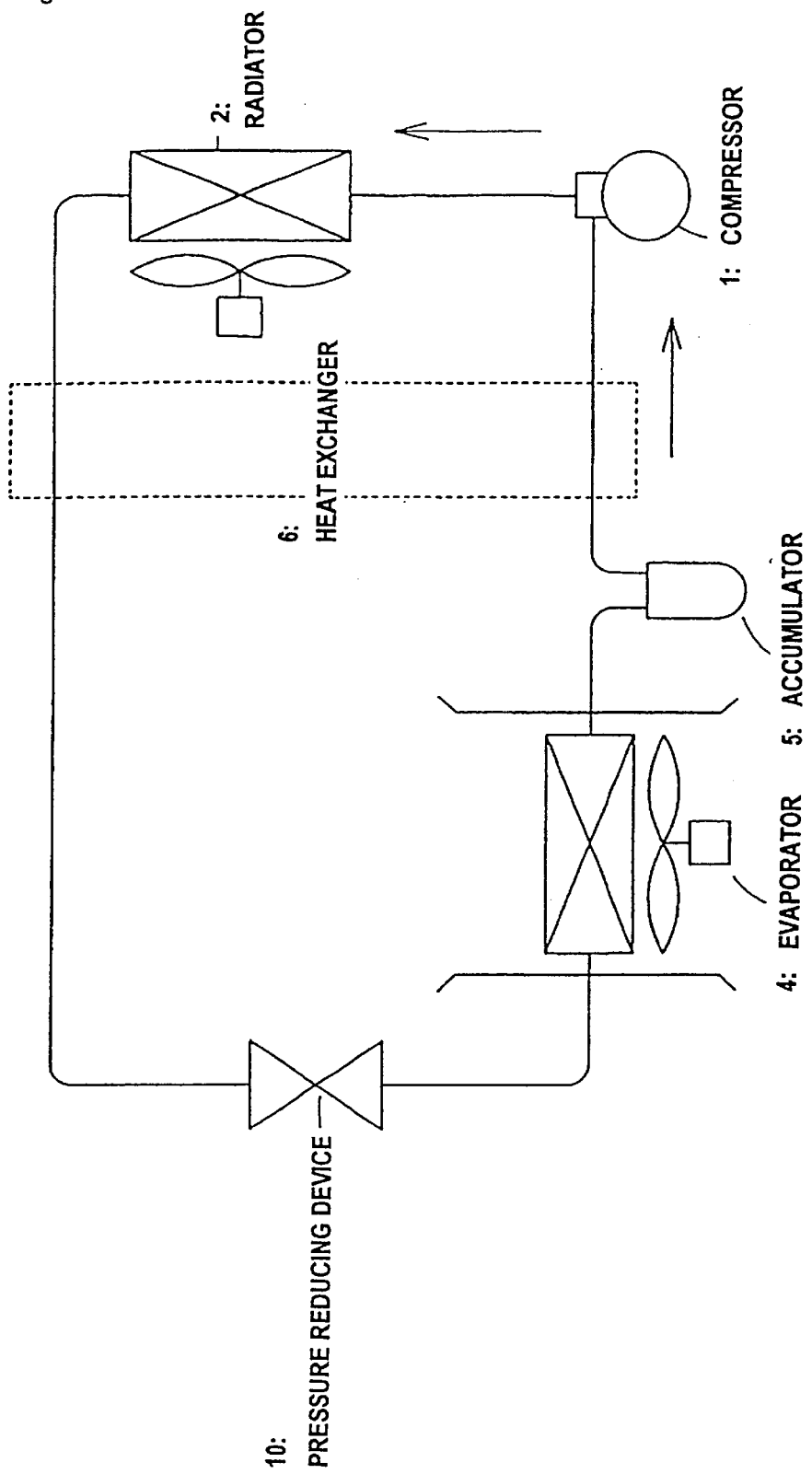

FIG. 5 illustrates a refrigerating cycle for a car airconditioner operating, for example, with carbonic acid gas as a refrigerant Carbonic acid gas as a refrigerant needs considerably higher operating pressure than conventional refrigerants in turn requiring special pressure and flow control measures. The refrigerant is compressed by a compressor 1 and is passed through a radiator 2 arranged outside a vehicle compartment and further through a pressure reducing device, i.e. an expansion valve, constituted by a pilot-operated flow regulating valve 10. From said valve 10 the refrigerant is supplied to an evaporator 4 constituting an interior radiator. After temporarily being accumulated in an accumulator 5 the refrigerant is returned to the compressor 1. In a heat exchanger 6 heat is exchanged between the refrigerant which is about to be introduced into the compressor 1 and the refrigerant which has just passed through radiator 2.

Figure 1:
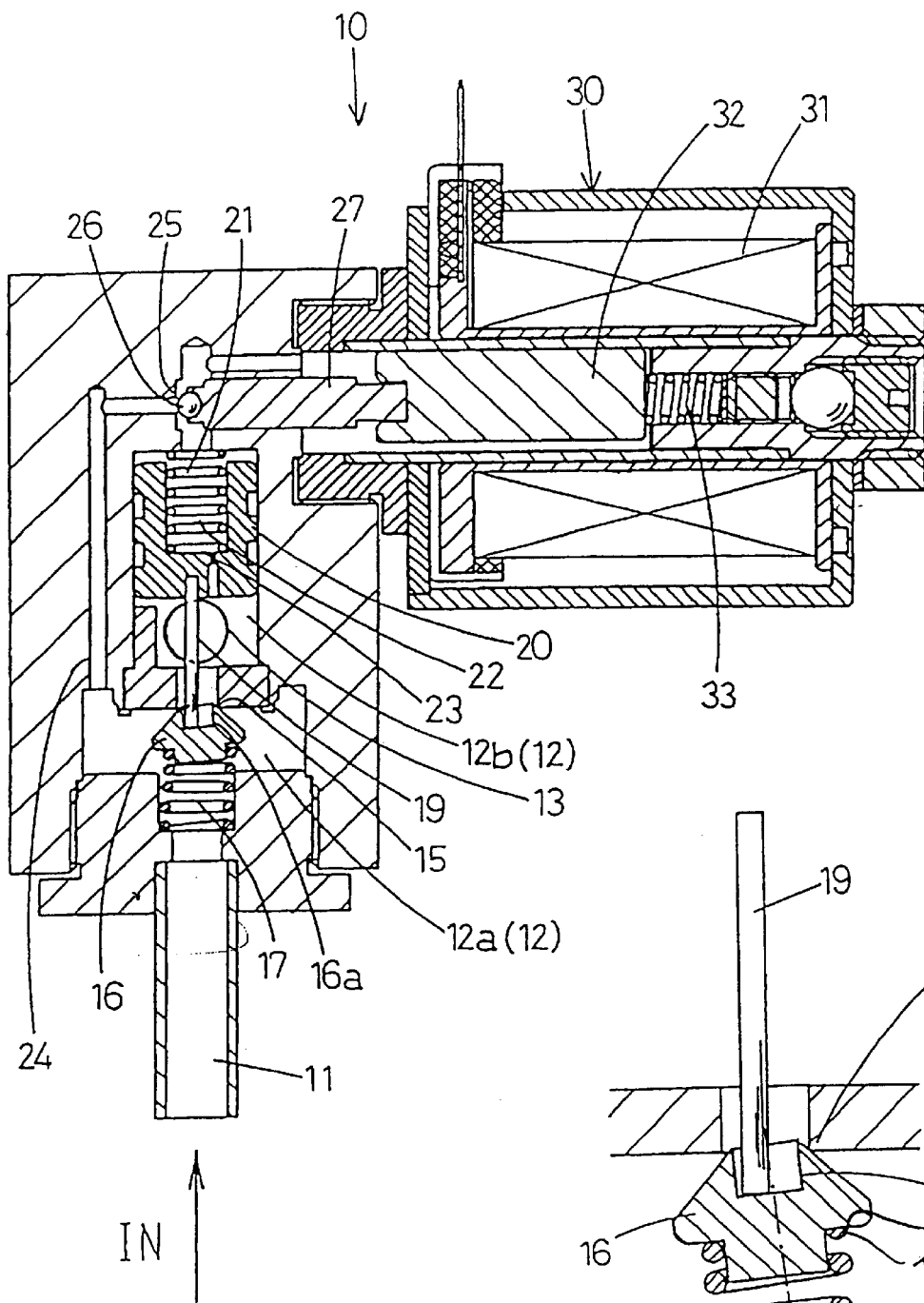
FIG. 1 a longitudinal sectional view of a first embodiment of a pilot-operated flow regulating valve, showing an open state, FIG. 2 an enlarged sectional view of a detail of FIG. 1, FIG. 3 a longitudinal sectional view of the first embodiment, showing a closed state, FIG. 4 a longitudinal sectional view of a second embodiment of a pilot-operated flow regulating valve, showing an open state, and FIG. 5 a schematic block diagram illustrating a refrigerating cycle containing a pilot-operated flow regulating valve defining a pressure reducing device of said refrigerating cycle.
Figure 2:
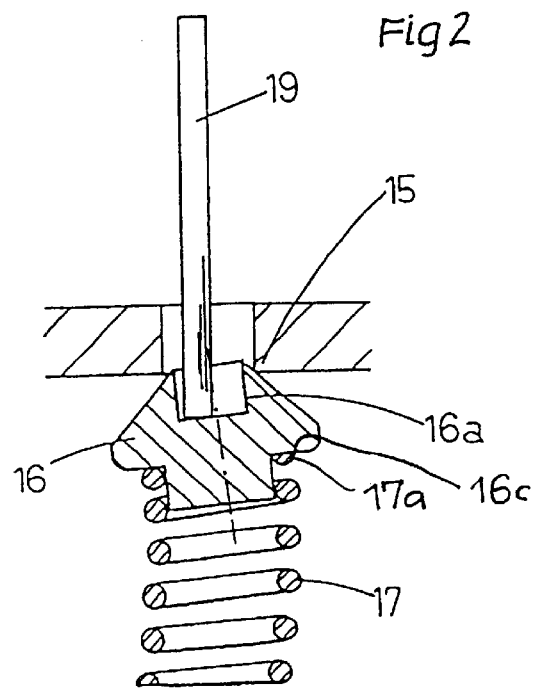
Figure 3:
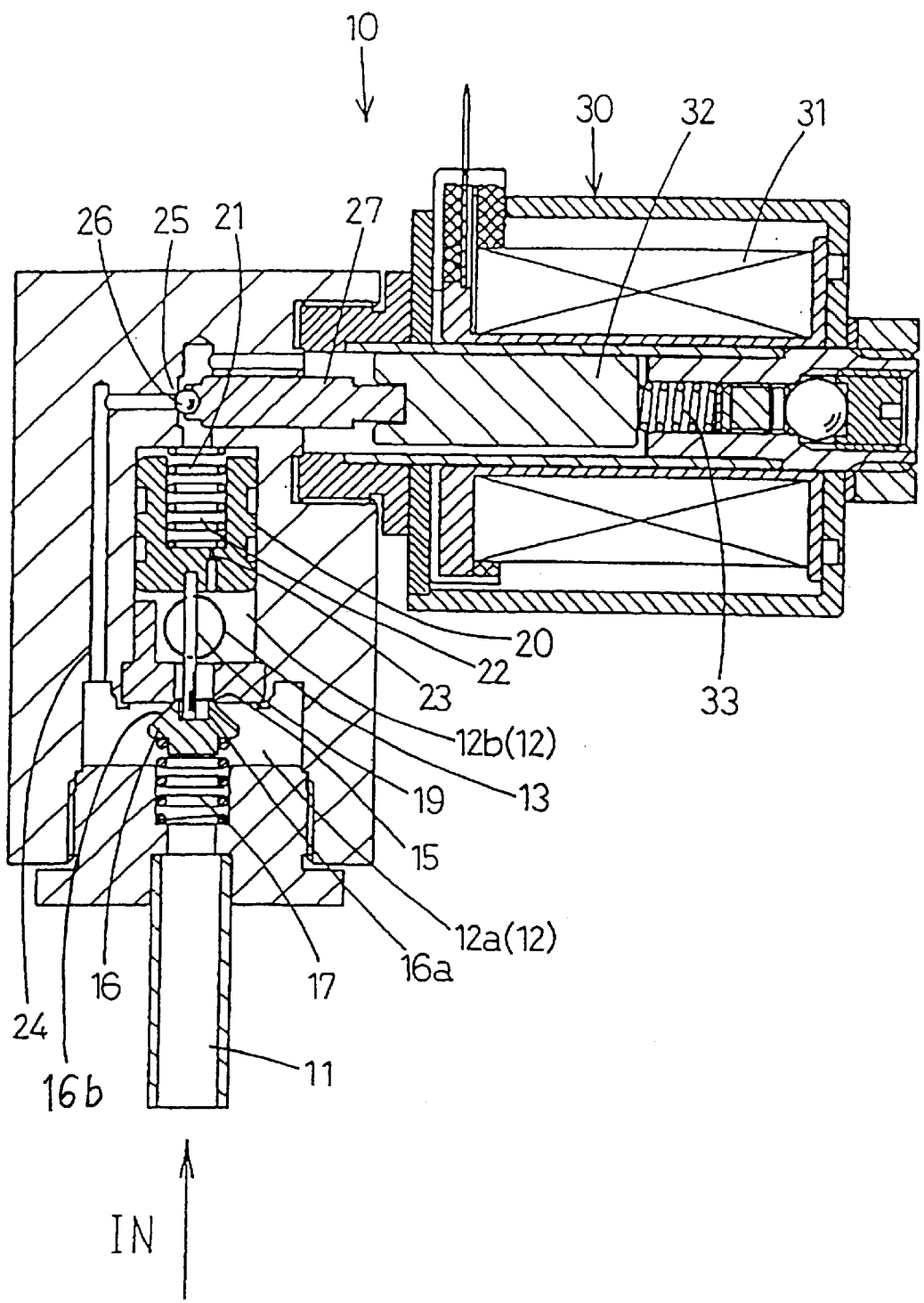

In a first embodiment of said pilot-operated flow regulating valve 10 in FIGS. 1 to 3 an inlet pipe 11 introduces high-pressure carbonic acid gas as the refrigerant A passage connecting said inlet pipe to an outlet hole 13 constitutes a refrigerant passage 12. Between a first portion 12b and a second portion 12a of said refrigerant passage 12 a valve seat 15 is formed defined by a circular hole with a circular sealing edge having a central axis.

In said second portion 12a a main valve element 16 is arranged upstream of valve seat 15 so as to face valve seat 15 from upstream. Main valve element 16 is urged by a compression coil spring 17, constituting an urging means, arranged coaxially with said main valve 16 longitudinal axis in a direction such that it is pressed against valve seat 15 from an upstream side.

Main valve element 16 has a conical surface facing valve seat 15. In a first, completely seated position, i.e. when said main valve is closed, said conical surface abuts against the entire circular circumference of valve seat 15. In an apex of main valve element 16 a recess 16a is formed with a flat bottom surface. Said first portion 12b between valve seat 15 and outlet hole 13 is made cylindrical with a constant inner diameter much larger than the diameter of valve seat 15. Within said cylindrical portion a piston-like pressure receiving member 20 is axially moveably received at a location such that it does not close outlet hole 13. Pressure receiving member 20 has an effective pressure receiving area larger than the pressure receiving area of main valve element 16.

Pressure receiving member 20 is urged in a direction towards valve seat 15 by a compression coil spring 21. A rear side of said pressure receiving member 20 confines within said cylindrical portion a pressure control chamber 22. Pressure receiving member 20 receives at its front surface the pressure of the refrigerant in said first portion 12b and receives the pressure in the pressure control chamber 22 at its rear surface. Pressure control chamber 22 and first portion 12b communicate via a leak hole 23 of small cross-sectional area. Leak-hole 23 can e.g. be formed in pressure receiving member 20 or in the housing. A driving rod 19 (a driving force transmitting member) is interposed between pressure receiving member 20 and main valve element 16. Pressure receiving member 20 and main valve element 16 move together in directions such that said main valve element 16 moves towards and away from valve seat 15. As soon as said main valve is closed, said main valve element 16 is completely seated by its conical surface against the circular edge of valve seat 15. In other positions main valve element 16 clears an opening of variable cross-section for the fluid passing through valve seat 15.

Driving rod 19 has an outer diameter much smaller than the inner diameter of recess 16a of main valve element 16 and the inner diameter of the circular hole of valve seat 15. Driving rod 19 is positioned eccentrically with respect to main valve element 16, i.e. the longitudinal axis of driving rod 19 is laterally offset with respect to the longitudinal axis of main valve element 16 or at least with respect to the longitudinal axis of coil spring 17.

Driving rod 19 has an end portion passed through valve seat 15 and abutting against the bottom surface of recess 16a of main valve element 16. Driving rod 19 is not fixed to main valve element 16. It may be optionally fixed to pressure receiving member 20.

Said first portion 12a of passage 12 and pressure control chamber 22 communicate with each other via a pilot channel 24. Within pressure control chamber 22 a pilot valve element 26 is arranged facing a pilot valve seat 25 formed at the mouth of pilot channel 24. pilot channel 24 may be formed by a pipe or the like. Pilot valve element 26 e.g. is attached to a distal end of a valve pusher piston 27 which is arranged moveably in directions towards and away from pilot valve seat 25. The other end of valve pusher piston 27 abuts against an end face of a moveable iron core of a solenoid 30. Moveable iron core 32 is urged by a compression coil spring 33 having constant spring force in a direction such that the pilot valve element 26 is pressed against pilot valve seat 25 by the force of said compression coil spring 33. The force by which the pilot valve element 26 is pressed against pilot valve seat 25 decreases with increasing current supplied to a coil 31 of solenoid 30, because these electromagnetic driving force acting upon the moveable iron core 32 acts counter to the urging force of compression coil spring 33.

Provided that the value of the current supplied to coil 31 is fixed, said pilot element 26 is lifted from said pilot valve seat 25 if the differential pressure between the upstream and downstream sides of said pilot valve seat 25 (i.e. the differential pressure between the upstream second portion 12a of passage 12 and said pressure control chamber 22) becomes higher than a given value. Said pilot valve closes if the differential pressure becomes lower than said given value. By respective motions of pilot valve element 26 said differential pressure is kept essentially constant. Said differential pressure is at a maximum when no current is supplied to coil 31.

If pressure in said first downstream portion 12b of passage 12 increases, pressure receiving member 20 moves in a direction bringing said main valve element 16 into its first completely seated closing position, as shown in FIG. 3. If the pressure in said downstream first portion 12b decreases, pressure receiving member 20 is moved in a direction to open the main valve or to move said main valve element 16 in at least one of said other positions (away from valve seat 15), as shown in FIG. 1. Thanks to such operations the flow rate of the refrigerant flowing from inlet pipe 11 to outlet hole 13 is kept constant. Accordingly, by varying the value of the current supplied to coil 31 it is possible to adjust the flow rate of the refrigerant as desired.

During such operations as mentioned above, while the driving rod 19 tends to push main valve element 16 off from valve seat 15, the urging force of compression coil spring 17 acts upon main valve element 16 and tilts it, since driving rod 19 is positioned eccentrically with respect to main valve element 16 and compression coil spring 17. In FIG. 2 spring end turn 17a is abutting an abutment surface 16c of said main valve element 16. Due to said tilting action the conical surface of main valve element 16 is pressed against a part of the ridge line of circular valve seat 15 (FIG. 2) whereby vibration of main valve element 16 is restricted and as a consequence, any generation of noise is suppressed.

Figure 4:
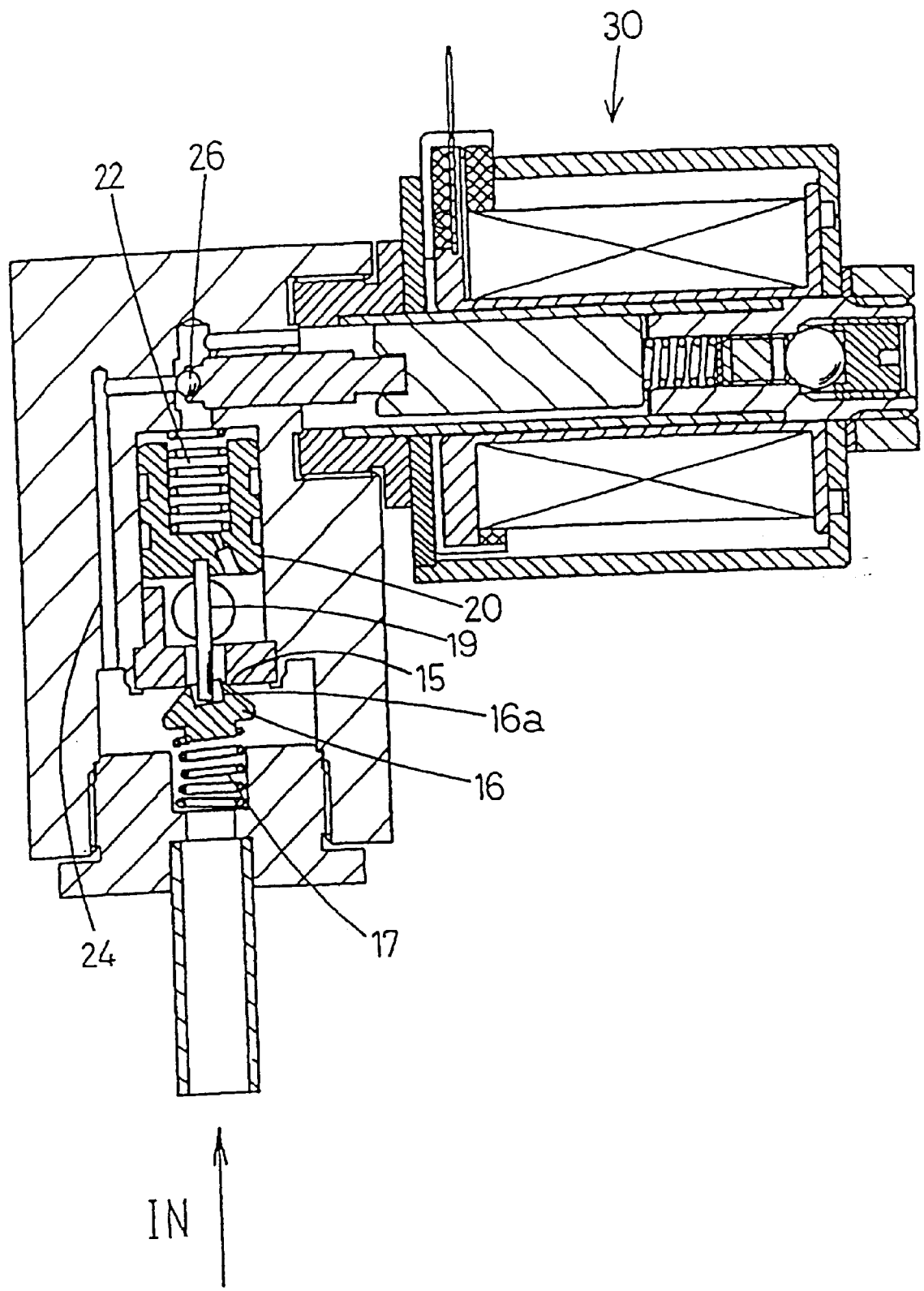

In a second embodiment in FIG. 4 said compression coil spring 17 which urges the main valve element 16 towards valve seat 15, has no end turns formed at its opposite ends (or at least on one of its opposite ends), so that while the main valve element 16 is forced into said other positions, the urging force of the compression coil spring 17 acts upon the main valve element 16 and tilts it into vibration suppressing contact e.g. with the ridge line of valve seat 15. "No end turn formed" means that no end turn does extend in a plane perpendicular to the longitudinal axis of the compression coil spring. Instead, in FIG. 4 the last spring turn extends, e.g. with essentially the same turn pitch as the other spring turns, towards a freely terminating turn end of said last spring turn which protrudes at a certain laterally offset location related to the respective axes of the coil spring 17 and/or main valve element 16. Said last spring turn even can be cut off perpendicularly to the core line of said last spring turn.

In FIG. 2 the tilting function forcing main valve element 16 in vibration suppressing contact with the circular valve seat 15 is achieved by the lateral offset between rod 19 and the longitudinal axis of coil spring 17 and of main valve element 16.

In the embodiments described having no coil spring end turn but an offset protruding free end of the last spring turn the tilting function for the main valve element is achieved by an offset force transmission from said free end of the last spring turn onto the abutment surface 16c of said main valve element 16. Additionally or alternatively even said abutment surface 16c of said main valve element 16 can be inclined by an angle smaller than 90° with respect to the longitudinal axis of said main valve element 16.

With this arrangement, i.e. a compression coil spring 17 having no end turn but a sidewardly protruding free end of the last spring turn and/or the inclined abutment surface 16c, the main valve element 16 will be tilted due to the eccentrically transmitted urging force of the compression coil spring 17, even if the driving rod 19 is positioned coaxially with the longitudinal axis of main valve element 16. Vibration of main valve element 16 efficiently is avoided thereby preventing generation of noise.

In a further not shown embodiment driving rod 19 and main valve element 16 may be positioned coaxially, but the compression coil spring 17 then may be positioned eccentrically with respect to these members, i.e. laterally offset to the longitudinal axes of main valve element 16 and driving 19. The compression coil spring even may have a protruding turn end contacting the main valve element 16. Furthermore, the present invention can be applied to various types of pilot-operated flow regulating valves differing from the shown and described embodiments in use or in the design of its individual components, etc.

What is claimed is:

1. A pilot operated flow regulating valve including a main valve element arranged in a flow passage to which high-pressure fluid is supplied, a circular valve seat formed in said flow passage, said main valve element facing said valve seat, a pressure receiving member arranged with its front surface exposed to the fluid in said flow passage, said pressure receiving member being moveable in accordance with a differential pressure between a fluid pressure applied to said front surface in a first portion of said flow passage and a pressure in a pressure control chamber bounded by a rear surface of said pressure receiving member, a driving force transmitting member interposed between said pressure receiving member and said main valve element so as to move said pressure receiving member and said main valve element in directions such that said main valve element moves towards said valve seat into a first, completely seated position and away from said valve seat into other positions allowing a fluid flow through said valve seat, a pilot passage connecting said pressure control chamber with said second portion of said flow passage located at a side of said valve seat opposite to said pressure receiving member, a leak passage of small cross-sectional area permitting leak of fluid between said pressure control chamber and said first portion of said flow passage, urging means for urging said main valve element in a direction opposite to a driving direction of said pressure receiving member, and a pilot passage constant differential-pressure regulating valve which opens when a differential pressure between an inlet and an outlet of said pilot passage becomes higher than a given pressure in order to keep said differential pressure essentially constant, wherein in said other positions of said main valve element at least one of said urging means and said driving force transmitting member is forcing said main valve element into a vibration suppressing contact with only a portion of said circular valve seat.

2. The pilot-operated flow regulating valve as in claim 1, wherein in said other positions said main valve element is tilted laterally with respect to a longitudinal axis of said circular valve seat into said vibration suppressing contact with said portion of said circular valve seat.

3. A pilot-operated flow regulating valve, of a vehicular refrigeration cycle, using carbonic acid gas as the refrigerant, including a main valve element arranged in a flow passage to which high-pressure fluid is supplied, a circular valve seat formed in said flow passage, said main valve element facing said valve seat, a pressure receiving member arranged with its front surface exposed to the fluid in said flow passage, said pressure receiving member being moveable in accordance with a differential pressure between a fluid pressure applied to said front surface in a first portion of said flow passage and a pressure in a pressure control chamber bounded by a rear surface of said pressure receiving member, a driving force transmitting member interposed between said pressure receiving member and said main valve element so as to move said pressure receiving member and said main valve element in directions such that said main valve element moves towards said valve seat into a first, completely seated position blocking any fluid flow and into other positions away from said valve seat allowing a fluid flow through said valve seat, a pilot passage connecting said pressure control chamber with a second portion of said flow passage located at a side of said valve seat opposite to said pressure receiving member, a leak passage of small cross-sectional area permitting leak of fluid between said pressure control chamber and said first portion of said flow passage, urging means for urging said main valve element by an urging force in a direction opposite to a driving direction of said pressure receiving member, and a pilot passage constant differential-pressure regulating valve which opens when a differential pressure between an inlet and an outlet of said pilot passage becomes higher than a given pressure in order to keep said differential pressure essentially constant, wherein in said other positions a said urging force of said urging means acts upon said main valve element so as to tilt the same and to thereby restrict vibration of said main valve element.

4. The pilot-operated flow regulating valve as in claim 3, wherein said main valve element is facing said valve seat from an upstream side, said urging means is urging said main valve element from said upstream side towards said valve seat, said pressure receiving member being arranged so as to expose its front surface to the fluid in said first portion of the flow passage downstream of said valve seat, and said pilot passage connecting said pressure control chamber with said second portion of said flow passage upstream of said valve seat.

5. The pilot-operated flow regulating valve as in claim 3, wherein said driving force transmitting member and said urging means are positioned eccentrically with respect to each other or with a lateral offset between their respective longitudinal axes, whereby the urging force of the urging means acts upon the main valve element so as tilt the same counter to the urging force of said member while the main valve element is in said other positions.

6. The pilot-operated flow regulating valve as in claim 3, wherein said urging means comprises a compression coil spring having no end turn formed therein, whereby the urging force of the urging means acts upon the main valve element so as to tilt the same while the main valve element is in one of said other positions.

7. The pilot-operated flow regulating valve as in claim 3, wherein said main valve element has a conical surface facing said circular valve seat for abutting with said conical surface against the circular valve seat.

8. The pilot-operated flow regulating valve as in claim 7, wherein said driving force transmitting member comprises a rod-like member passing through said valve seat and abutting with an end portion against said main valve element, an abutting portion of said main valve element having a recess formed therein for loosely receiving said end portion of said rod-like member.

9. The pilot-operated flow regulating valve as in claim 3, wherein said pilot-passage constant differential-pressure regulating valve comprises a solenoid operated valve having a coil, the differential pressure value being controllable by current supplied to said coil.

10. The pilot-operated flow regulating valve as in claim 6, wherein said compression coil spring has an end portion abutting an abutment surface of said main valve element, said end portion being defined by a protruding turn end of a last spring turn which last spring turn e.g. extends towards said turn end with a turn pitch essentially equal to the turn pitch of the other spring turns of the compression coil spring.

11. The pilot-operated flow regulating valve as in claim 3, wherein said urging means is constituted by a compression coil spring having an end portion abutting an abutment surface of said main valve element, said abutment serving surface of said main valve element being inclined with respect to a longitudinal axis of said main valve element by an angle differing from 90°.

* * * * *